(12) United States Patent
Seiden et al.

(10) Patent No.: US 10,531,152 B2
(45) Date of Patent: *Jan. 7, 2020

(54) TRACKING AND RESPONDING TO DISTRACTING EVENTS

(71) Applicant: Comcast Cable Communications, LLC, Philadelphia, PA (US)

(72) Inventors: Joshua Seiden, Englewood, CO (US); Derek Johnson, Sedalia, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,708

(22) Filed: Dec. 3, 2014

(65) Prior Publication Data
US 2015/0201237 A1 Jul. 16, 2015

Related U.S. Application Data

(63) Continuation of application No. 13/742,934, filed on Jan. 16, 2013, now Pat. No. 8,955,002.

(51) Int. Cl.
| | | |
|---|---|---|
| *H04N 21/45* | (2011.01) | |
| *H04N 21/466* | (2011.01) | |
| *H04N 21/472* | (2011.01) | |
| *H04N 21/432* | (2011.01) | |
| *H04N 21/442* | (2011.01) | |
| *H04N 21/433* | (2011.01) | |

(52) U.S. Cl.
CPC ... *H04N 21/44218* (2013.01); *H04N 21/4325* (2013.01); *H04N 21/4334* (2013.01); *H04N 21/4532* (2013.01); *H04N 21/4667* (2013.01); *H04N 21/47217* (2013.01)

(58) Field of Classification Search
CPC ......... H04N 21/44218; H04N 21/4667; H04N 21/4325; H04N 21/4334; H04N 21/4532; H04N 21/47217
USPC .............................................. 725/12, 88, 89
See application file for complete search history.

(56) References Cited

U.S. PATENT DOCUMENTS

| | | | | |
|---|---|---|---|---|
| 6,452,615 B1* | 9/2002 | Chiu | ................... | G06F 3/04883 375/E7.004 |
| 8,769,557 B1* | 7/2014 | Terrazas | ........... | H04N 21/44218 725/12 |
| 9,389,832 B2* | 7/2016 | Karlsson | ................... | G06F 7/00 |
| 2002/0012526 A1* | 1/2002 | Sai | ....................... | G11B 19/022 386/241 |
| 2003/0046437 A1* | 3/2003 | Eytchison | ........... | H04L 12/2803 709/250 |
| 2003/0061183 A1 | 3/2003 | Schaffer et al. | | |
| 2005/0262542 A1* | 11/2005 | DeWeese | ............. | H04L 12/1818 725/106 |
| 2006/0080716 A1 | 4/2006 | Nishikawa et al. | | |

(Continued)

*Primary Examiner* — James R Sheleheda
*Assistant Examiner* — Franklin S Andramuno
(74) *Attorney, Agent, or Firm* — Banner & Witcoff, Ltd.

(57) ABSTRACT

A distraction monitoring system may monitor a user's consumption of content, such as video content, and identify times at which the user is distracted from the content. The identified times may then be presented with a timeline for the video program, and the user may be permitted to view the distractions that occurred during the viewing of the video program. The user may select a distraction, and the video content may be played back from a corresponding playback point.

31 Claims, 12 Drawing Sheets

(56) References Cited

U.S. PATENT DOCUMENTS

| | | | |
|---|---|---|---|
| 2006/0188234 A1 | 8/2006 | Takeshita | |
| 2007/0104369 A1* | 5/2007 | Weatherhead | H04H 60/45 382/181 |
| 2010/0150520 A1* | 6/2010 | Hopwood | H04N 5/783 386/278 |
| 2011/0173570 A1* | 7/2011 | Moromisato | G06F 17/30994 715/838 |
| 2011/0234784 A1* | 9/2011 | Sugino | H04N 21/4223 348/77 |
| 2011/0252160 A1* | 10/2011 | Wu | G06F 17/227 709/246 |
| 2013/0047175 A1* | 2/2013 | Ramirez Flores | H04H 60/45 725/12 |
| 2013/0083011 A1 | 4/2013 | Geisner et al. | |
| 2013/0152113 A1* | 6/2013 | Conrad | H04N 21/42201 725/12 |
| 2013/0262984 A1* | 10/2013 | Mehr | G06F 17/2247 715/234 |
| 2014/0067828 A1 | 3/2014 | Archibong et al. | |
| 2014/0169677 A1* | 6/2014 | Wu | G06K 9/46 382/190 |
| 2015/0278687 A1* | 10/2015 | Sculley, II | G05B 13/00 706/47 |

\* cited by examiner

TRACKING AND RESPONDING TO DISTRACTING EVENTS

CROSS REFERENCE TO RELATED APPLICATION

This application is a continuation of U.S. patent application Ser. No. 13/742,934, filed Jan. 16, 2013, which is incorporated herein by reference.

BACKGROUND

It can be difficult to set aside an uninterrupted hour or two to enjoy a simple television program or movie at home. Ringing phones, knocking doors, instant messages, children, and a variety of other demands on a viewer's attention can cause the viewer to miss important plot points of a show. There is, and will always be, a demand for useful tools to help keep an audience engaged, and to help users manage their content consumption experience.

SUMMARY

Features described herein may assist a user in their content consumption experience by monitoring distracting events (e.g., an incoming telephone call, disruptive conversation, doorbell, time spent on a tablet computer, etc.) that occur during the user's consumption of the content, and keeping track of those distractions for later use. An event monitor may maintain a timeline of distracting events corresponding to the presentation of a piece of content, such as a video program, and the user may view the timeline to see where and how he/she was distracted during the initial consumption of the program. In some embodiments, the user can then select one of the distractions to either learn more about it, or to resume playback of the content beginning from a point in time corresponding to the distraction.

In some embodiments, the distraction may be an event on a second screen computing device, which may be different from a device used to consume the content. The event on the second screen may be, for example, the user navigating to an Internet site (e.g., one that is related to the content), playing a game, reading a book, or any other form of interaction with the second screen computing device.

In some embodiments, the user may provide a set of distraction preferences, which may be used to determine how the system should react to different types of detected distractions. For example, the user may identify a plurality of software applications on a second screen device, and indicate which applications should be handled as a distraction when used during the consumption of content, and which applications should not be considered distractions when used during the consumption of content. A variety of preferences may be established for a variety of combinations of distracting events and conditions, and the preferences may be used to determine whether a particular event should be considered to be a distraction.

In some embodiments, an event monitor may respond to a user's distraction by automatically pausing the presentation of content, and/or by recording the content. In some embodiments, multiple users may be simultaneously consuming content on the same device (e.g., a common display), and the event monitor may arbitrate between user preferences to determine whether to pause and/or record the content when one of the users becomes distracted.

In some embodiments, the event monitor may display a graphical timeline for a user's consumption of the content, showing the times during the content's presentation in which the user was distracted. The user may select one of the distractions, and begin viewing the video program again from point in time that corresponds to the distraction time. The timeline may include graphical images, corresponding to the distraction and/or corresponding to scenes in the content, to assist the user in understanding the times.

These features in the summary above are merely illustrative of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
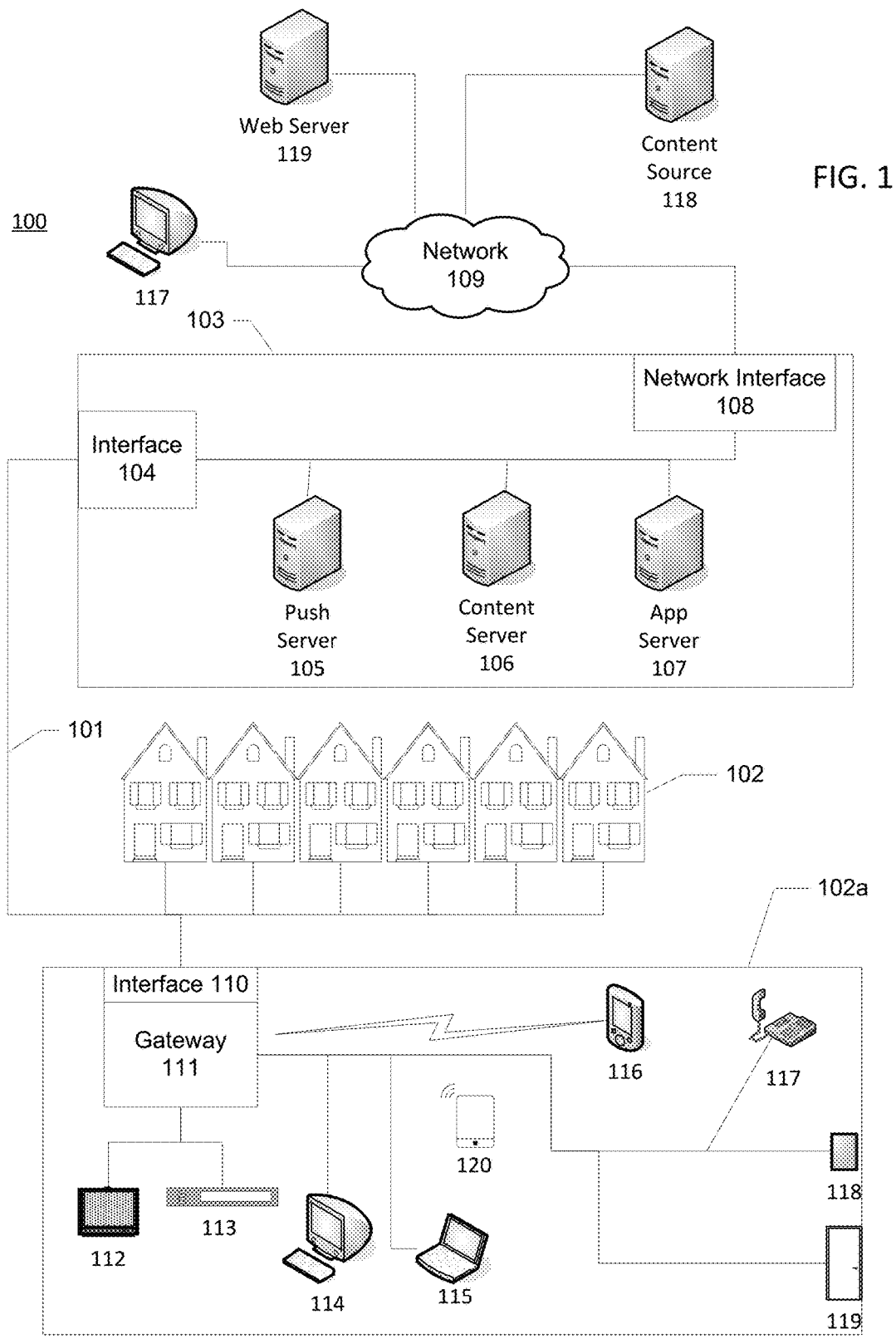
FIG. 1 illustrates an example information access and distribution network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOC SIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
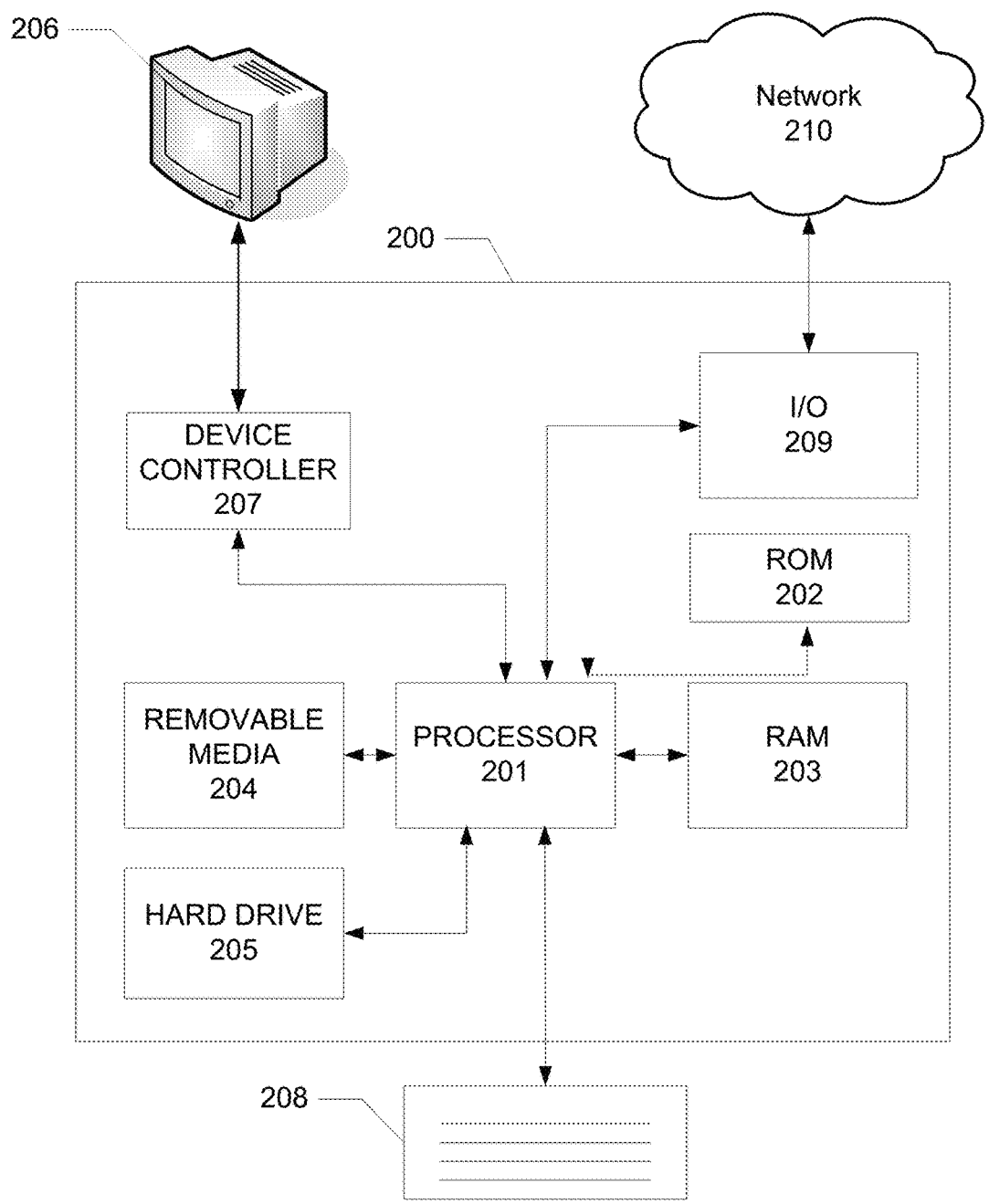
FIG. 2 illustrates an example computing device that may be used to implement any of the features and devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

In some embodiments described herein, a consumption event monitoring device may be used to track events occurring while a user was consuming (e.g., watching, listening to, and/or otherwise consuming) a piece of content, such as a movie. The event monitoring device may be implemented using any desired computing device, such as computing device 200, and may be a part of the gateway 111, an application server 107, or other computer. The event monitoring device may be communicatively connected to a variety of devices at the premises, such as telephones 117, window security sensors 118, door security sensors 119, second-screen viewing devices 120 (e.g., tablets, smartphones, etc.), or other devices.

Figure 3A:
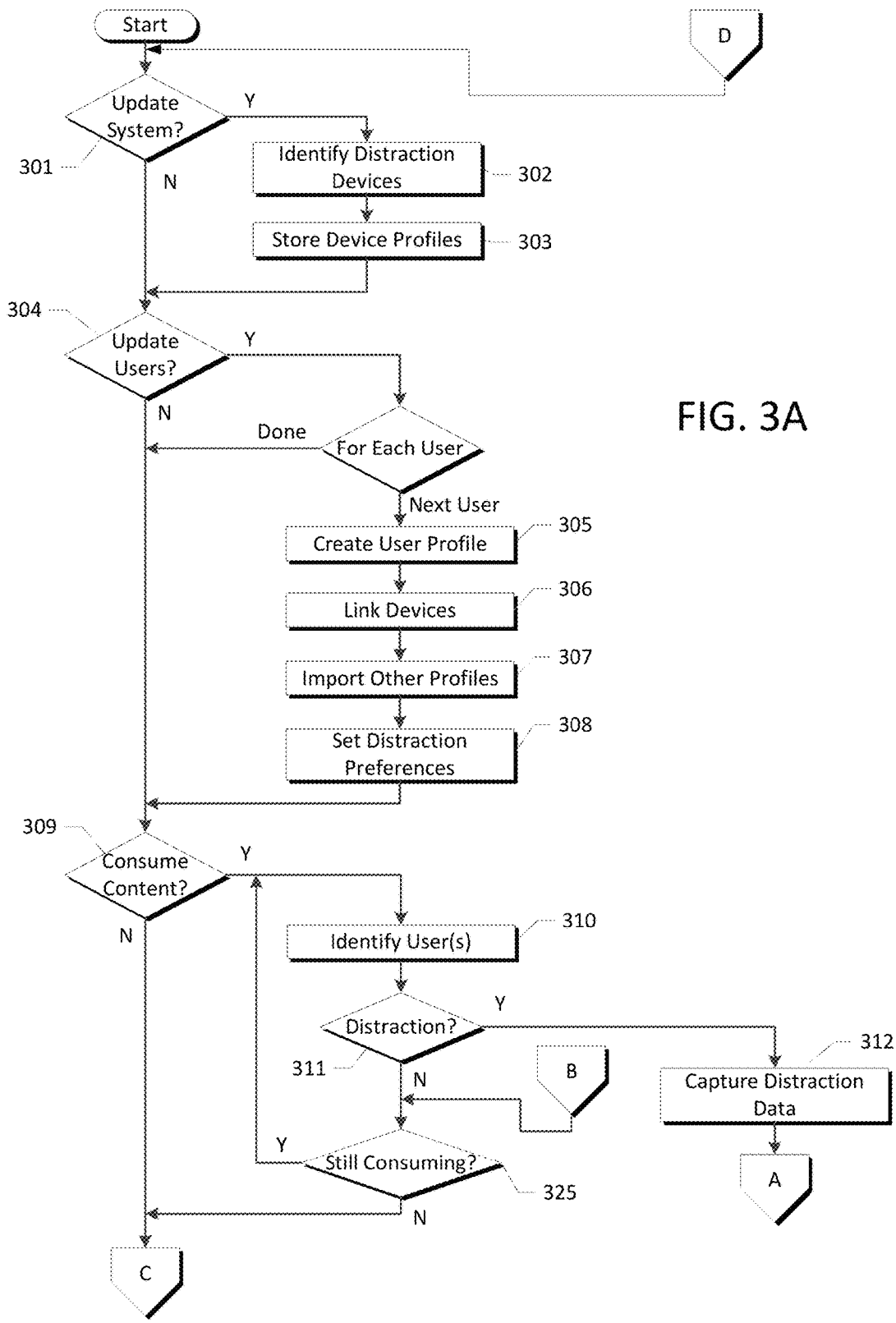
FIGS. 3a-c illustrate an example process flow for handling user distractions.
Figure 3B:
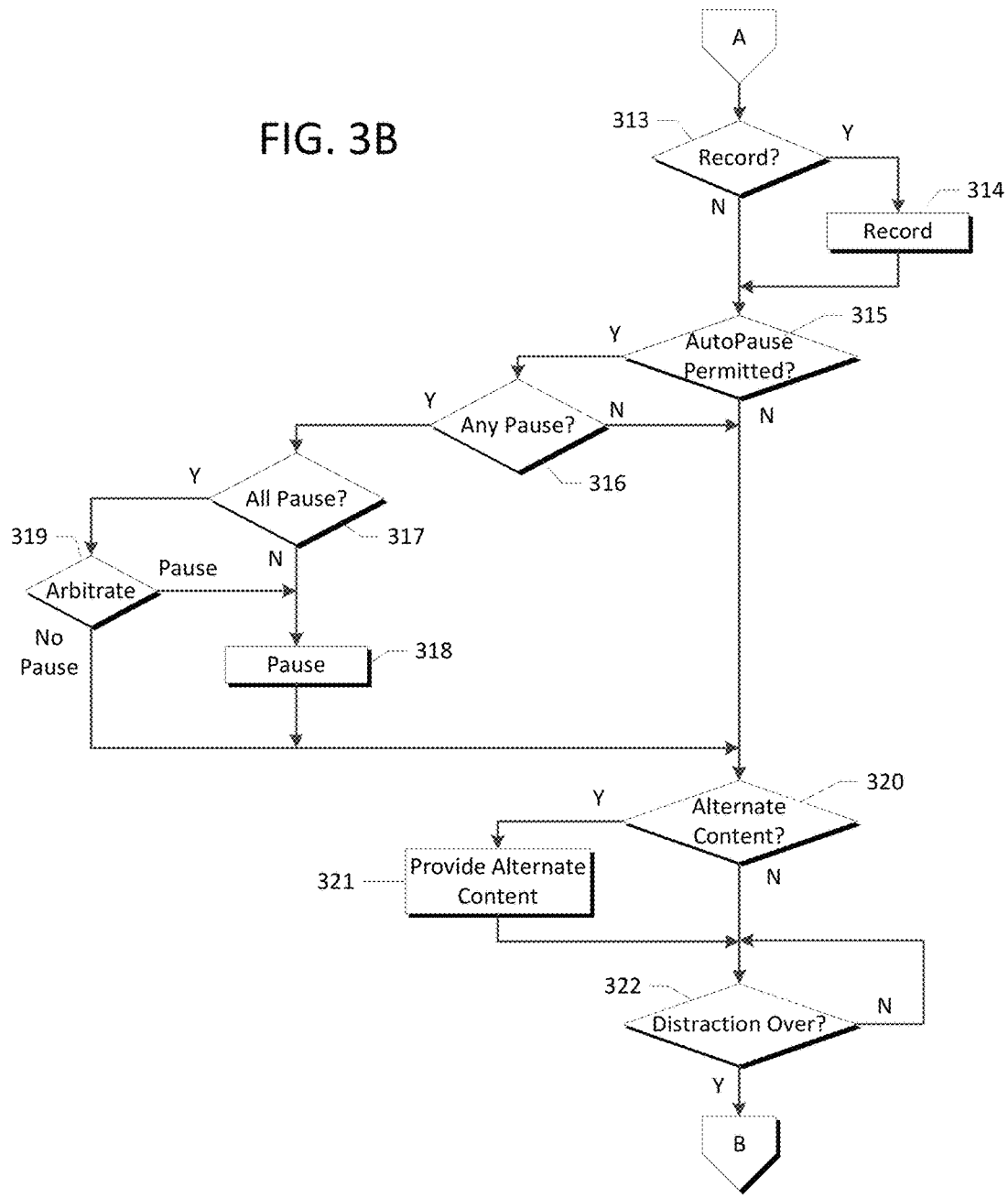
Figure 3C:
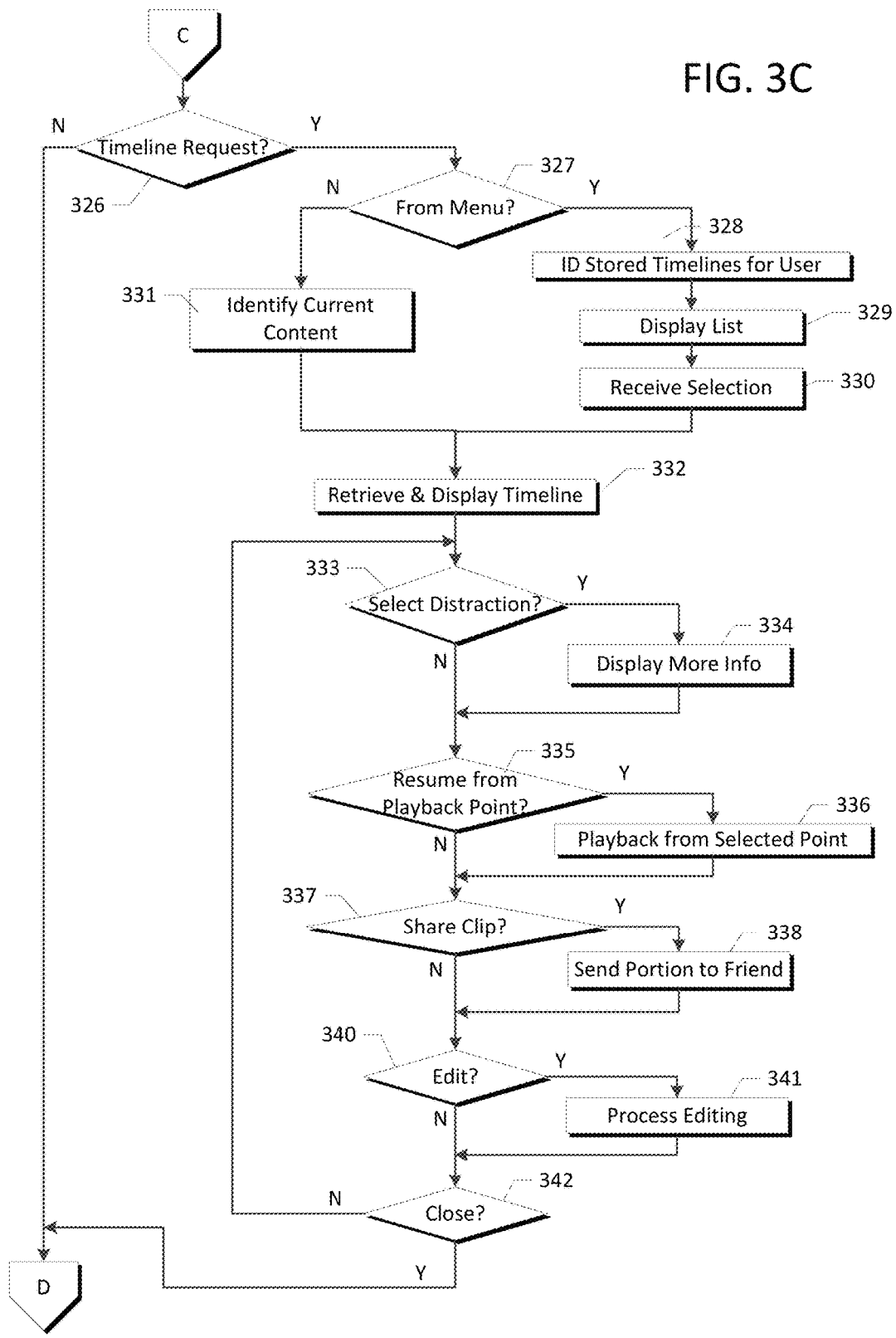

FIGS. 3A-C illustrate an example method of aspects of the disclosure. The methods may be implemented, for example using the event monitoring device described herein. In step 301, the event monitoring device (or any other device) starts up (e.g., upon initial installation, or powering up), and determines if system configuration data needs to be updated. The system configuration data may be information stored by the event monitoring device to identify the various types of events and devices that will be monitored. One way that the system might check if an update is needed is by checking for the existence of a system configuration file. In another aspect, there might be a flag indicating that the system needs to be setup. For example, if the system is new and being started for the first time, or if new devices have been added to the premises (e.g., the addition of a new tablet computer, smart phone, home security device sensor, etc.), or if a user requests a system update, then a system configuration update may be performed.

If a system update is needed, then in step 302, the system update may begin with the event monitoring device identifying distraction devices at the premises. This identification may be done, for example, by issuing a request to the gateway 111 or network interface 110, requesting an identification of all devices that are connected and configured to provide any form of user alert or distraction to the user. The identification may entail identifying computing devices that are connected to a wired or wireless network at the premises, telephones that are operative, home security sensors (e.g., window sensors, door sensors, motion-activated cameras, etc.), a camera box, a laptop, a desktop computer, a tablet computing device, a phone, a smartphone, a handheld gaming device, a building security system, lights, a refrigerator, a garage door opener, or any other device that may serve to distract a user from consumption of content. Devices may also be identified by a user, without automatic detection.

Identifying a device may also involve determining one or more ways in which the device may distract a user from content consumption, and the manner in which the distraction will be reported to the event monitor device. The distraction may vary depending on the distracting device. For example, a telephone 117 may distract a user from content if the user actively engages in a voice (and/or video) communication session using the phone 117, and the phone may report to the event monitor when such a session is established. A door 119 may distract a user by being opened in response to a doorbell (and possibly also in response to the user getting up in response to the doorbell), and sensors for both may report their activation to the event monitor. A tablet computer or smartphone may distract a user by simply being used (e.g., actively surfing Internet sites, playing games, conducting calls, etc.), and the tablet may send a distraction message to the event monitor, identifying details of the usage such as user identification and application used. Some devices may have multiple types of uses, some of which might not be considered distracting, and others that may be considered distracting. For example, a door 119 might not be considered a distraction if it was opened without a preceding doorbell ring, on the assumption that the door was opened from the outside by someone entering the premises. As another example, some devices may offer multiple applications (e.g., a smartphone with many applications), and only some of the applications may be considered distracting. The other non-distracting applications may be considered simple in nature, such as a clock application, and might not demand a significant amount of the user's attention. As another example, an in-room environmental sensor may infer a distraction based on sensed conditions. For example, an audience-facing camera may be part of a digital video recorder (DVR) or gateway 111, and may be configured to detect and recognize individual users. The camera may detect when a particular user has gotten up and left the room, fallen asleep, or is facing away from the television for a predetermined amount of time, and may report this as a distraction to the event monitor device. An in-room microphone may be used to detect when users are speaking in the room, and may signal a distraction if a user speaks for more than a predetermined amount of time.

In step 303, the event monitoring device may store one or more device profile data files for the devices identified in step 302. The stored information may identify the various types of distractions that the devices are capable of generating, such as the telephone voice session or the tablet Internet browsing application discussed above, as well as an identification of the manner in which the distraction will be signaled to the event monitor device. For example, the information may indicate that a telephone will transmit an off-hook message to signal a distraction, while a door security sensor may simply transmit a door open signal. As another example, a tablet computing device may transmit a distraction message identifying the application and user to the event monitor device. The table below illustrates example information that can be stored for an event monitor device operating on a gateway 111:

| Distraction | Source Device | Distraction Signal | Condition |
| --- | --- | --- | --- |
| 1 | Front Door | Open Door Signal on Port 11 | Doorbell rang first; User |
| 2 | Telephone | Voice Session by VOIP Module | User |
| 3 | Tablet 1 | Distraction Message | User |
| 4 | Camera | Distraction Message | User |

In the illustrated example, the data may identify the distracting device, and the manner in which an incoming signal will identify a distraction. For example, the Front Door distraction may receive an open door signal on a physical port that is hard-wired to a simple make/break electrical contact switch on the user's front door (e.g., a physical port 11 may be closed). The Telephone device may transmit a voice session message, indicating the establishment of a VOIP session, while the Tablet 1 and Camera devices may send a predefined distraction message to the event monitor device. The distraction message may be a packet identifying the sending device, a distraction code, and the affected user.

In step 304, the event monitoring device may determine if at least one user profile needs to be created or updated. A user profile may store information identifying event monitoring preferences for individual users, and a profile may need updating or creating if a user requests to add or update a profile, or if a user begins consuming content and the user is not otherwise identified to the event monitor device. The request may be entered, for example, by a user using a computing device to access a network site operated by the event monitoring device, and issuing a request to update or modify user profiles. In one embodiment, the system has only one user profile for all viewers or users. In another embodiment, the system allows every user to establish and configure a unique user profile. If a new profile is to be added or updated, the system goes to step 305 and initiates a loop that creates a data file storing the user profile for each desired user profile. Creating the user profile may include establishing a name for the profile, establishing how much storage space on the device the profile is allowed to use, establishing whether the profile is the default profile, or other user-profile settings familiar to one of skill in the art. In one embodiment, the system associates a user's biometric identification with the user profile, such as the user's voice, face, image, fingerprints, or the like. Additional settings known to one of skill in the art may also be included in creating a user profile.

Figure 4:
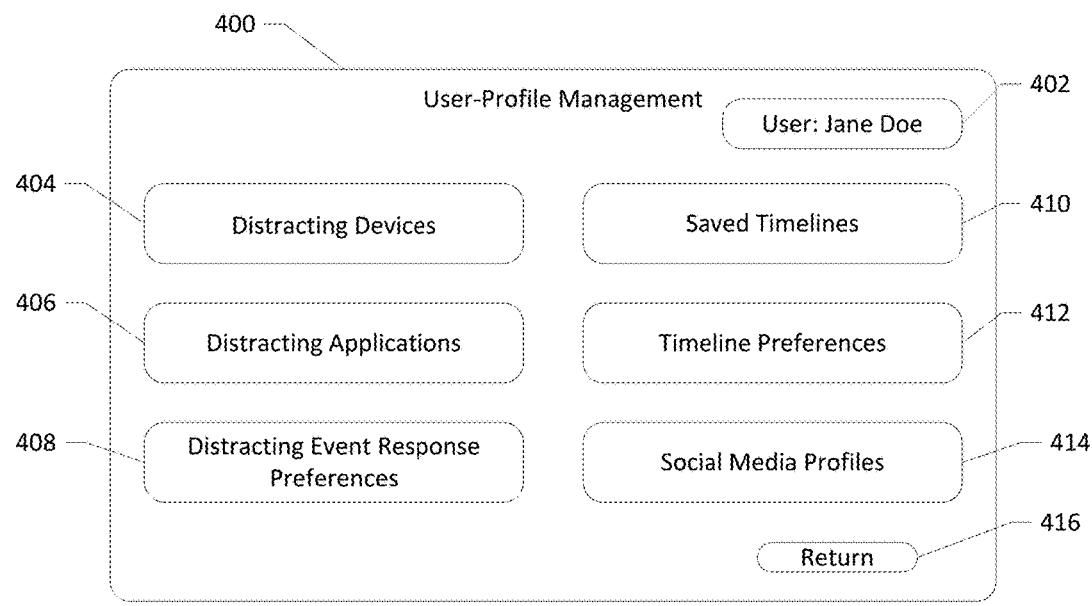
FIGS. 4-14 illustrate various user interface screens that may be displayed to the user, for example at various stages in the process shown in FIGS. 3a-c.

Once a user profile has been established, user-profile distraction settings may be updated. FIG. 4 illustrates one example of a user-profile management screen 400. The user-profile management screen may, in one embodiment, be accessed by a button on the system remote, by an item in another menu, by a web interface, by a mobile app, or some other way familiar to those of skill in the art. In one aspect, the user-profile management screen includes a return button 416 to return to the screen displayed before the user-profile management screen was accessed.

In the illustrated embodiment of the user-profile management screen 400, the user can update the user profile settings stored in the system. Many of the specific settings associated with the user profile, which may be edited from the user-profile management screen 400, will be discussed in more detail later on. For example, the user-profile management screen 400, in one embodiment, may allow a user to change distracting device settings 404 or change distracting application settings 406. These settings 404, 406 will be discussed in more detail later on.

The user-profile management screen 400 may allow the selection 402 of a different user. For example, if a system allows the creation of multiple user profiles, each profile may have its own set of settings, accessible from the user-profile management screen 400. In the illustrated embodiment, the selected user 402 is Jane Doe. In one embodiment, when the user selects the displayed selected user 402, a drop-down menu or pop-up menu appears that allows a different user profile to be selected. By providing the various settings, the user may indicate his/her distraction profile, which can be represented by a data table storing an identification of various types of distracting events, and corresponding conditions and actions. For example, the following data may be stored for the user, identifying various conditions for a particular distraction reaction:

| Distraction Source | Distraction App/Mode | Distraction Time | Content ID | Content Source | Consumption Device | Response |
|---|---|---|---|---|---|---|
| Door/Doorbell | N/A | 6 pm-10 pm | Any | Any | Family Room TV | Auto-Pause and Record |
| Telephone | Outgoing Call | Any | Any | VOD | Family Room TV | Record |
| Tablet Computer | Email; Calendar | Any | Any | ESPN | Any | None |

Distraction source—identification of the source device causing the distraction (phone, door sensor, tablet, etc)

Distraction application—identification of an application or mode of the distraction source (e.g., identifying a video game application, or a calendar application)

Distraction time—time or time range during which the distraction occurred

Content ID—identification of the content that was being consumed at the time of the distraction. For example, this can be a program title, or a unique code identifying the program or its series.

Content Source—identification of a service that provides the content. For example, a television network (e.g., ESPN), or web site.

Consumption Device—device that was used to consume the content. Some users may decide that distractions while viewing content on a first device (e.g., a personal computer) should be handled differently from distractions that occur while viewing the content on a second device (e.g., a large-screen family television).

Figure 5:
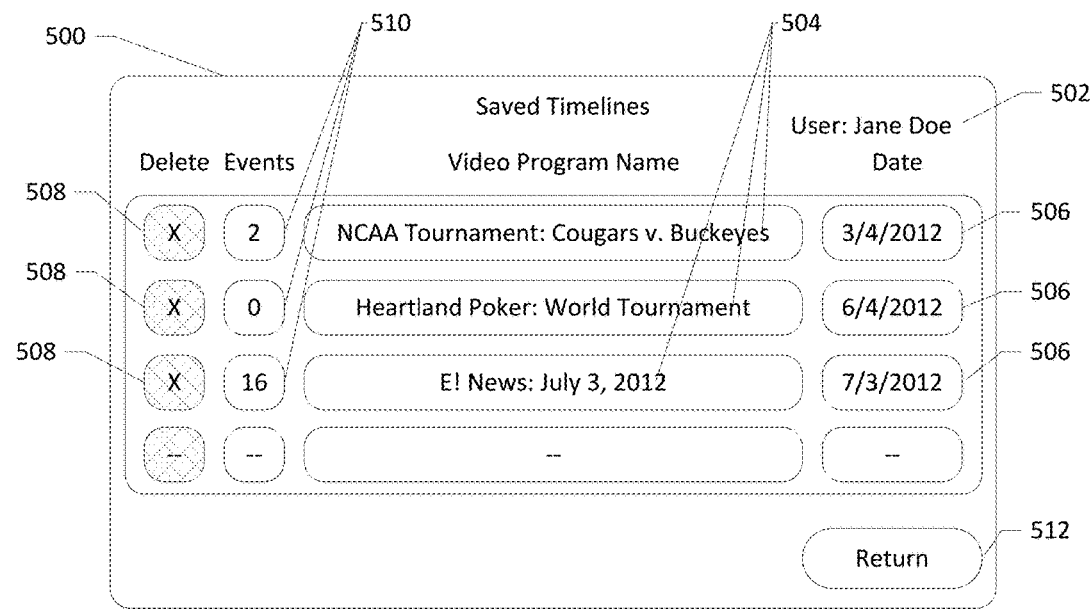

The profile management screen 400 may allow a user to interact with all the saved timelines 410 associated with her profile. FIG. 5 shows one embodiment of a Saved Timeline Screen 500. Timelines will be discussed in more detail later, but as an introduction, a timeline is a display that shows a listing of events that occurred during a user's consumption of content, such as the viewing of a video program. The Saved Timelines screen 500 may identify the name 502 of the user with whom the listed timelines are associated. In another embodiment, the Saved Timelines screen 500 may display all the saved timelines on the system, regardless of which user each timeline is associated with. The screen 500 may list include various pieces of information about each listed timeline, such as the video-program name 504, the date the timeline was created 506, and the number of distracting events 510 recorded in that timeline. Other information displayed on the screen 500, not illustrated, could include one or more screenshots of the video program, a description of the video program's content or plot, the video program's actors, producers, director, etc., or other information about the video program. There could also be other information about the timeline, such as if another user is associated with that timeline, or other information that is apparent to one of skill in the art. The Saved Timeline Screen 500 may also include a way to delete one or more timeline listings, such as a button 408. A user may return 512 to the user-profile management screen 400.

Figure 6:
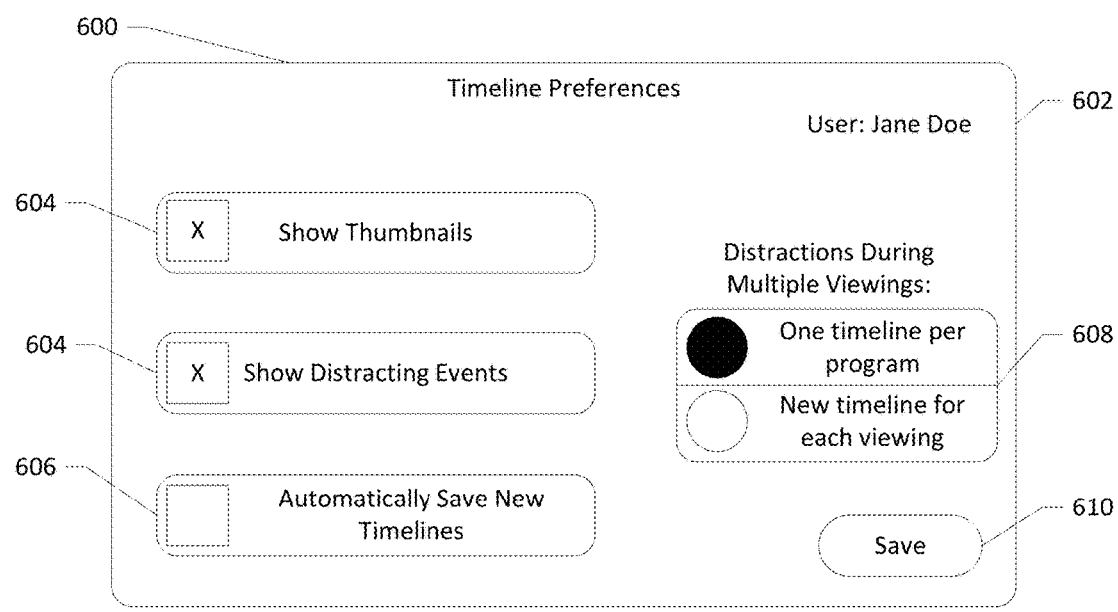

The profile management screen 400 may allow a user to manage timeline preferences 412. An example screen 600 for managing user timeline preferences is shown in FIG. 6. Timeline preferences could be user specific, and so the screen 600 might include a display of the currently selected user 602. A variety of timeline preferences may be offered. For example, the user may be given the option 604 to include video program thumbnails as part of the displayed timeline. The thumbnails may display a screen capture from a video program corresponding to the time at which an event (e.g., a distracting event such as a phone call or doorbell ring) occurred. The option 604 may also include an option to display images corresponding to distracting events, such as a home security video camera image corresponding to a doorbell ring, or a caller ID-based profile picture of a caller corresponding to an incoming telephone call. Other potential timeline preferences might include listing or indicating significant events from the show, distractions from other users, or the like. Another preference might be how to handle creation of new timelines. For example, in one embodiment, the system can automatically generate and save 606 newly-created timelines for every video program whose consumption or viewing is interrupted by a distracting event (the alternative being requiring a user request to create the timeline). Another preference setting could include how to handle distracting events 608 from multiple viewings for the same video program. In one embodiment, the user can select to aggregate distracting events 608 from multiple viewings of the same video program, while in another embodiment the user can opt to instead create a new timeline that records the distractions from each distinct viewing of the same video program. These are merely some examples of preferences that could be set with regard to timelines, and one of skill in the art will recognize other ways that a user or system could be customized to display timelines in different manners.

Figure 7A:
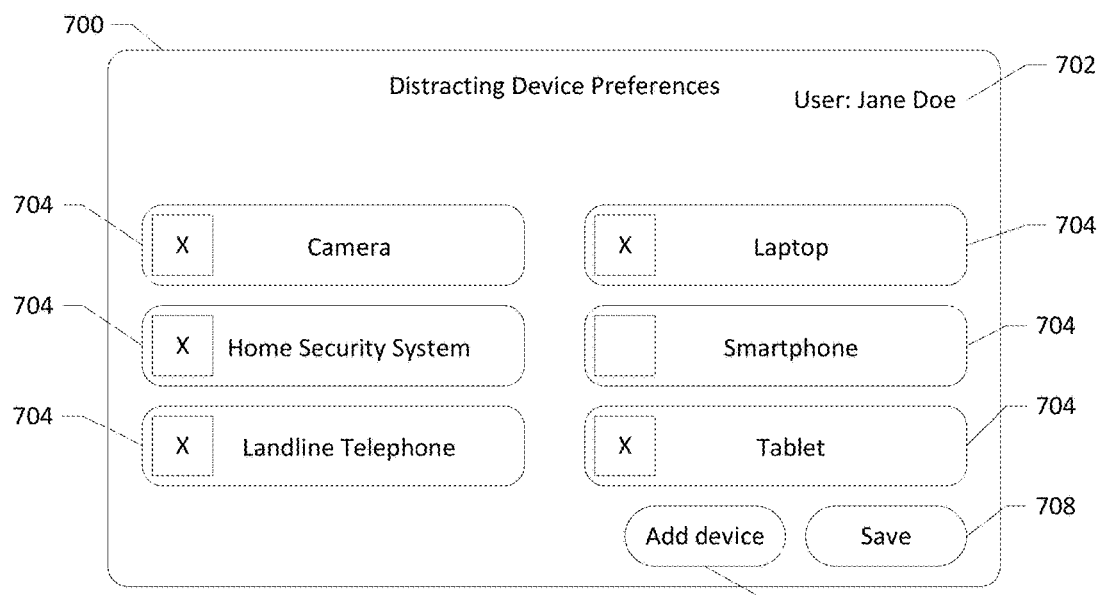

Returning to FIG. 3, after a user profile has been created in 305, the system links devices to the user profile in step 306, to help identify ways in which the user might be distracted. The linked devices may be the ones identified in step 302, and the linking may include storing information identifying a relationship between the user and the device. For example, a user's profile may identify a cell phone as being that user's cell phone, which would be useful in determining how to handle interruptions on the device. The linking may be accomplished, for example, by listing the various devices that were identified in step 302, and giving the user the option to mark those devices (e.g., with a checkbox) as being associated with the user. FIG. 7a illustrates an example display screen that can be shown to a user (e.g., on a user's tablet computer) to allow the user to link devices. The example FIG. 7a interface includes an identification 702 of the user profile for which preferences are being displayed or set. The user can select from a plurality of detected devices 704 the devices that should or should not be considered distracting. In one aspect, the event monitoring device displays a list of detected devices (e.g., from step 302) to the user, and allows the user to select which device or devices should be associated with the user's profile. The devices may be listed using names that are supplied by the user, or with other identifying information, such as a Media Access Control address, serial number, manufacturer name, model name, etc. In some embodiments, the device names may be obtained using a wireless communication protocol, such as Bluetooth, and the protocol may include signaling that provides a user-friendly name of the device. In some embodiments, an application running on the wireless device may be configured to exchange name identification information with the device running the service.

The user may also be given an option to add a device that was not initially detected in step 302, or is not otherwise listed in the FIG. 7a display. Selecting the "add device" button 708 may cause the event monitoring device to perform a re-scan, as in step 302, to identify newly-added devices (e.g., perhaps the user had a cell phone that was turned off at the time the event monitoring device did its initial identification scan). The user may also be given an option to introduce a new device that is not detected in the step 302 identification (e.g., if the device is not part of a network that is polled when the event monitoring device conducts its identification of devices 302). For example, the user may be given an option to supply address and/or identification information for any device that was not detected in step 302. For example, the user may supply a Media Access Control (MAC) address to inform the system of the new device to be added. Preference changes can be saved to the user profile by selecting the "save" button 708. In one aspect, selecting the "save" button 708 saves the preferences to the event monitoring device memory, then closes the interface 700 and returns to a previously viewed screen, or returns to regular video program viewing. In another aspect, selecting the "save" button 708 simply saves the preferences to the system memory.

Note that, as discussed earlier, different user profiles may have unique preferences. For example, in FIG. 7b, the illustrated Distracting Device Preference interface 700 is for the user 712 John Doe's preferences, whereas in FIG. 7a the illustrated Distracting Device Preference interface 700 is for the user 702 Jane Doe's preferences. Jane Doe has one set of device preferences 704 selected, while John Doe has a different set of device preferences 714 selected. In other embodiments, different users can have unique settings for other variables as well, such as distracting applications, distracting event response preferences, timeline preferences, and more.

Figure 8:
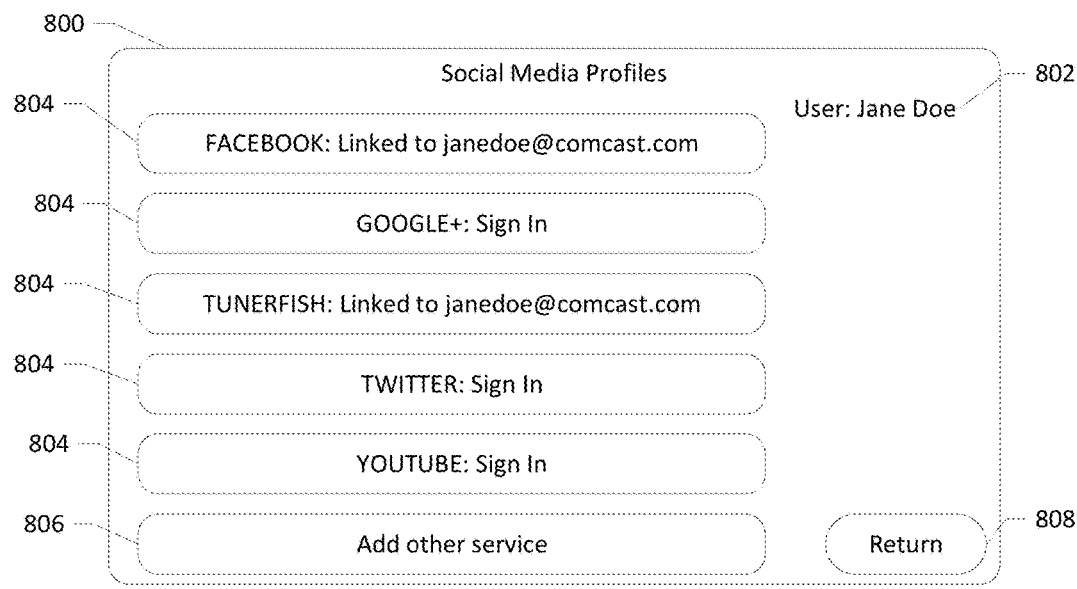

Returning to FIG. 3, after linking devices to the user profile in step 306, the system in step 307 may link to profiles for the user from other services, such as social network services, video subscription services, phone and internet services, etc. Such integration of the user's profile information from other services may help to customize the behavior of the event monitor device, as will be discussed further below. The social media profile button 414 in one embodiment of the user-profile management screen 400 links to the Social Media Profile user interface 800 depicted in FIG. 8. The interface 800 includes an indicator of what user profile 802 the social media profiles are associated with. A number of social media profiles 804 could be associated with the user profile. For example, the user could link a FACEBOOK, GOOGLE+, TUNERFISH, TWITTER, or YOUTUBE profile 804. In the depicted aspect, additional social media services can be added to the system by selecting the "Add other service" button 806, which can lead the user to a screen requesting a network address of the service (e.g., an Internet address) and login credentials (e.g., user name and password). The user can return to the previous screen, such as the user-profile management screen 400, by selecting the return button 808.

As noted above, the system could also link the user profile with profiles from other services besides social networks. For example, this may include linking a user's television subscription information. In another example, a user could link an email service provider, a telephone service provider or phone number, or the like. Additional services that could be associated with a user profile might include an account with a video streaming service provider such as HULU, NETFLIX, or AMAZON. One of skill in the art will recognize additional service profiles that could be associated with a user account.

In step 308, the user may configure the event monitor device to dictate the type of distractions that will be tracked and recorded for the user, and how. The event monitor device may be configured to respond to distracting events according to different distracting event user preferences. Example distracting event responses in one embodiment might include automatically recording or stopping recording of a video program, automatically pausing playback of a video program, turning off the system, or doing nothing. Another preference setting may be to respond differently depending on which user is distracted. For example, Jane Doe may wish to set the system to only respond to events that distract her. Alternatively, she may wish to set the system to respond to events that distract her or her husband John Doe, but not either of their children James Doe or Judy Doe. Distraction response settings may also be show-specific. For example, Jane Doe may set the system to respond to events that distract her or Judy Doe when an NCAA football game is on, but not to events that distract John Doe during the game. One of skill in the art will recognize various other preference settings or combinations of settings that may be possible.

Figure 9:
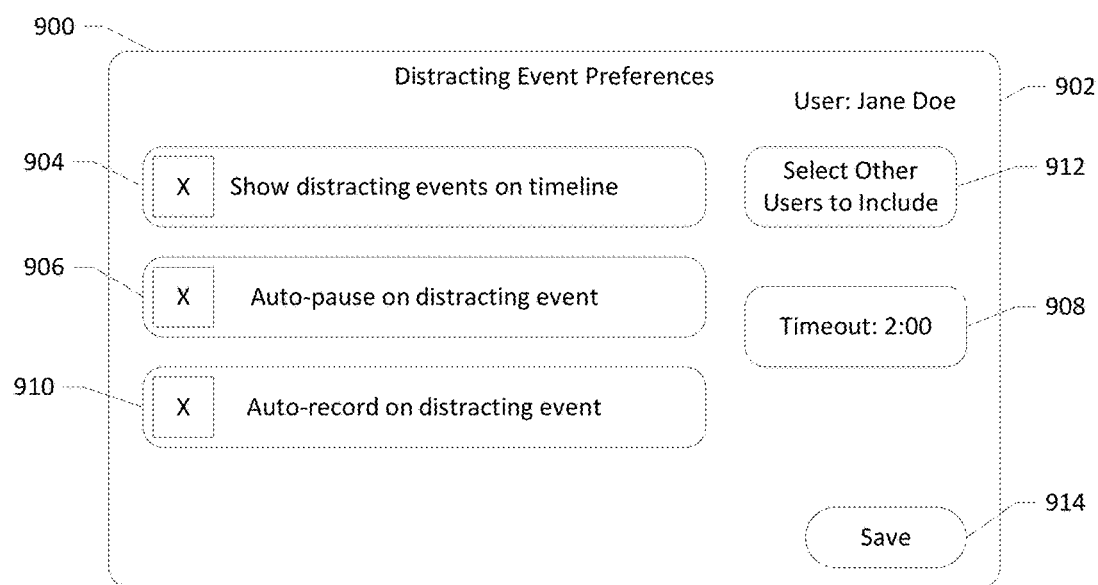

An example interface for configuring user distracting event preferences is shown in FIG. 9. The Distracting Event Preferences interface 900 can be accessed, in one embodiment, via the distracting event preferences button 408. The distracting event preferences interface 900 includes an indicator 902 of what user profile the displayed preferences are associated with. Example buttons for distracting user event preferences could include a show distracting events on the timeline selector 904 (indicating whether the user wishes to bother with seeing a timeline of distractions), an auto-pause on distracting event selector 906 (indicating that the user wishes to automatically pause content presentation in response to certain predetermined types of distractions), or an auto-record on distracting event selector 910 (indicating that the user wishes to automatically initiate recording of a program if one or more predetermined distractions occur). A selector 908 sets the auto-pause timeout that determines how much time the program auto-pauses for before resuming playback. The distracting preferences can also include additional options. For example, distractions can be set differently for different types of content or different services being consumed. For example, the user may determine that some video programs (e.g., the hometown football team's weekly game) are less tolerant of distractions than other video programs (e.g., a rerun of a crime drama), and this difference in tolerance can be reflected in the user profile settings. For example, the user may indicate that the football game should be auto-paused and recorded, but the crime drama need only be auto-paused without recording (beyond the pause buffer). The distracting event preferences interface 900 includes a save button 912 to save the changes to the current user profile.

Figure 10:
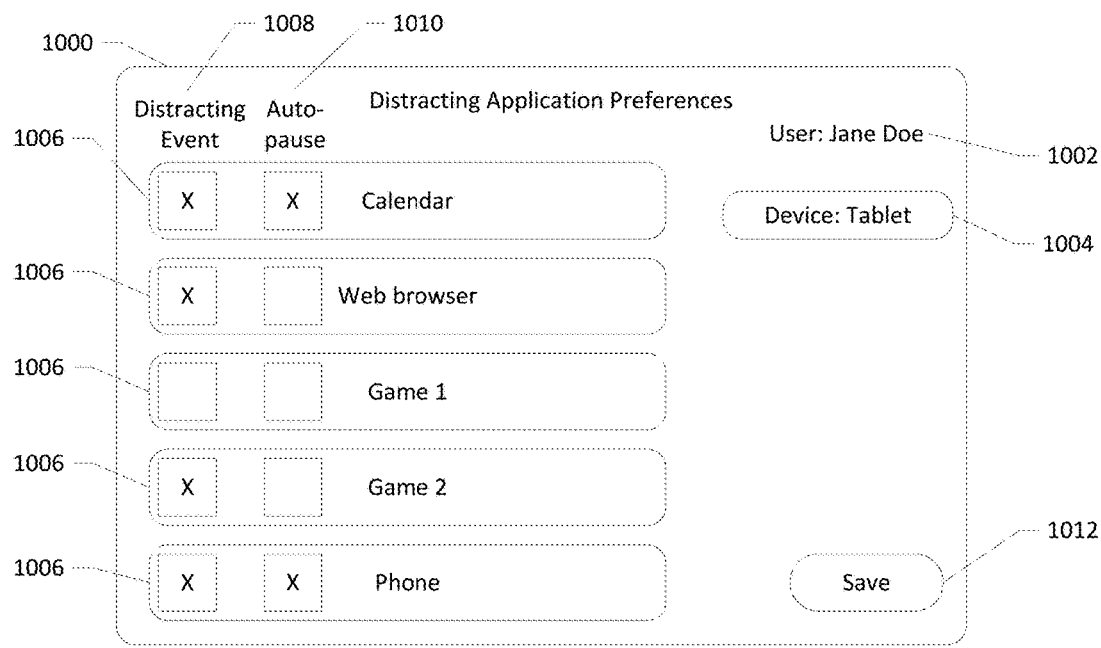

FIG. 10 is an example of an interface 1000 for setting Distracting Application Preferences, and may be accessed by the user when configuring the profile data. The interface 1000 allows a user to set which applications on a given device generate distracting events. This may be useful, for example, if the user wishes to inform the event monitor that he/she should not be considered distracted if he/she is using certain applications (e.g., a simple game, a fantasy football scoring application, or another application that the user is willing to give divided attention). The user 1002 is identified in the corner, and the distracting device may be identified 1004 as well. The interface 1000 includes a list of applications detected on a device associated with the user profile. For example, a user might have a tablet device associated with her user profile, so the distracting application preferences interface 1000 lists all the apps 1006 installed on the tablet. If the user also has a smartphone associated with her user profile, then she could change the device selector 1004 to list all the applications associated with her smartphone. In one embodiment, the user may change the device selector 1004 to select all devices, such as her tablet and smartphone, which causes the listed applications 1006 to list all applications installed on all devices. The interface 1000 includes a column 1008 for indicating which applications generate distracting events, such that usage of those applications during presentation of content may be recorded by the event monitor device as a distracting event. The interface 1000 may also include a column 1010 for indicating which distractions generate an auto-pause command, which can result in automatically pausing the presentation of the content in response to the distraction. Note that some applications may cause a distracting event, but not generate an auto-pause, if they are considered by the user to be minor distractions. For example, a user may determine that a phone application on a smartphone may be considered a serious distraction from watching a video program, and accordingly, the user may indicate that usage of that application should be treated as a distraction, and that the program content should be automatically paused while she is using that application. Other applications, however, such as Game 2, may be considered to be a distraction worth noting in the timeline, but too insignificant to warrant automatically pausing the video program. Yet other examples, such as the Game 1 example, may be so trivial that the user does not even consider its use to be a distraction from the video program.

Returning to FIG. 3, the event monitor may determine if content is being consumed. Content may be consumed, for example, if a user has tuned to a broadcast or multicast television channel or video stream, or has requested an on-demand stream of content such as a movie, or is playing back content that has been previously recorded by, for example, a DVR 113. The event monitor may determine that content is being consumed simply by determining, through exchange of status messages, that content is being streamed and/or rendered for display on a display 206. Additionally, the event monitor may employ other techniques to determine that content is being consumed. For example, the event monitor may employ a front-facing camera on the gateway 111 or DVR 113, which can record images of users who are facing a display 206, and use facial recognition algorithms to identify the users and determine whether they are facing the display or television.

If content is being consumed (or has been requested to be consumed), such as video program content being viewed, then in step 310, the event monitor may identify at least one user distraction profile for one or more of the consuming users. The event monitor could identify the user in a number of ways, including but not limited to a facial recognition scan using a camera, a fingerprint reader, or even a basic prompt that asks a user to identify herself. If multiple users are watching a video program, then the event monitor may identify every user watching the program. In one embodiment, the event monitor prompts users without user distraction profiles to create new profiles. In another embodiment, there is a default "guest" user distraction profile that is setup for all users without their own user distraction profile.

In step 311, the event monitor device can determine whether a consuming user has been distracted from the content, or whether the user has diverted his/her attention to something else. This may be determined through receipt of a distraction message from a distracting device, or if conditions have been met for a predetermined distraction. As noted above, a distraction message may be generated by any of the devices identified in step 302 and/or linked to a user in step 306, and the determination of a distraction may depend on the various device and/or user profile information discussed above. In some embodiments, the devices themselves may be loaded with the user profiles, and the devices may report distractions based on those profiles. In other embodiments, the devices may repeatedly report their status to the event monitor, and the event monitor device may compare the status information with the device and user profile information to determine whether conditions for a distraction have been met. A distraction can be any event that takes place that distracts the user from viewing a video program. Almost anything could be considered distraction. If the user's attention or eyes are diverted from the video program, it could be occurrence distraction. An event occurrence could be identified by any of a number of devices, as discussed earlier. For example, an event occurrence could be associated with a camera box, a laptop, a desktop computer, a tablet computing device, a phone, a smartphone, a handheld gaming device, or a building security system. Other examples may include IPv6 enabled devices, such as lights, a refrigerator, a garage door opener, or another device.

Examples of distractions that could be associated with a telephone include making or receiving a phone call, or composing or receiving a text message or email. Example event occurrences associated with a security system might be a doorbell ring, a door or window opening or closing, or a home or building's lights turning on or off. In one embodiment, a camera might detect if a user gets up to leave the room during a show, or if the user falls asleep, or even if two users are talking or otherwise interacting instead of watching the current video program, and that activity may be considered a distraction.

The distraction might occur on a second-screen device. For example, if a user is using a tablet computing device while a video program is playing on a television, the viewer's interaction with the tablet might be considered an event occurrence. The user might be surfing the Internet, playing a game, or interacting with another application. Or the user might simply be listening to music, an audiobook, or a news broadcast while watching the video program displayed on the television. In another example, the second screen event might correspond with the display of the video program to the user. For example, some television shows have a website associated with the show. During the live broadcast of the show, an indicator might appear on the television to direct the user to visit or otherwise engage with the show's website during the broadcast of that episode, and additional content related to the show may be presented at the website. Second-screen content could include additional video, character biographies, or other content determined by the show's creators. The tablet or computing device that is used to access the additional content could identify the interaction with the content as an event occurrence.

Figure 7B:
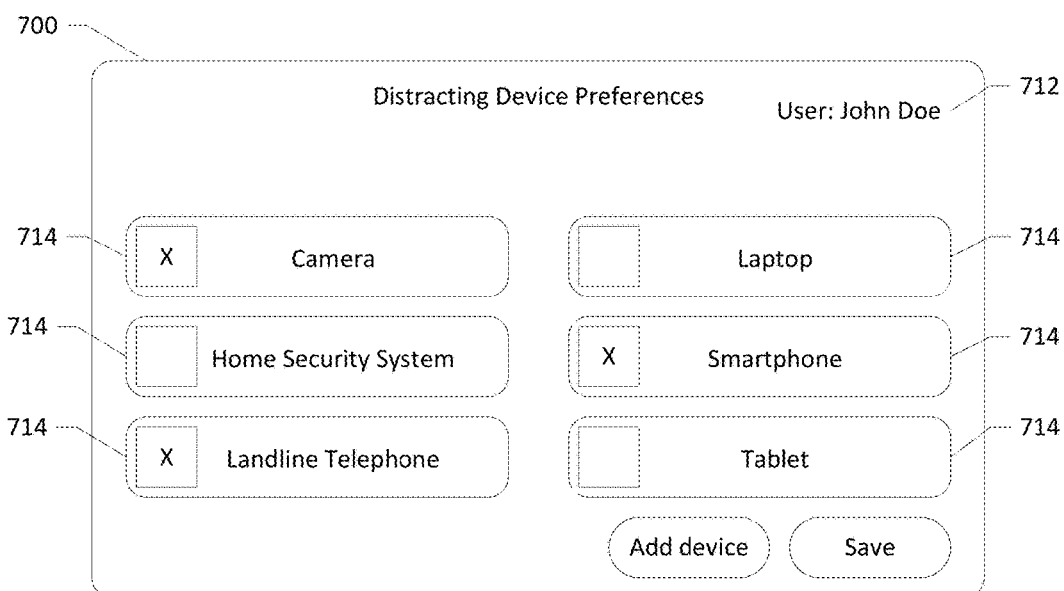

The event monitor may, in one aspect, use the user settings from the user profile preferences to determine what should or should not be considered a distracting event for that particular user. For example, as discussed earlier, and illustrated in FIG. 7, a user may set preferences for whether events from certain devices are or are not considered distracting events. Different users may have different preferences. For example, in FIG. 7a, Jane Doe does not want events generated by her smartphone to be considered distracting events. But as shown in FIG. 7b, John Doe wants events generated by his smartphone to be considered distracting events. Note, however, that John Doe does not want events generated by his home security system, laptop, or tablet to be considered distracting events.

In another embodiment, the event monitor may use an identification of an application to determine whether the event occurrence is a distracting event. For example, the event monitor determines what application is being accessed on a second-screen device, then checks a list of applications to determine whether the determined application is indicated as a distracting application. As noted above, a user might have pre-identified a list of applications on his device, where at least one application is identified as distracting, and at least one application is identified as non-distracting. If multiple users are viewing the content, the determination in step 311 might be done separately for each user. In some embodiments, addressed further below, an arbitration process may be used to help determine how best to respond to a situation in which some users are distracted but others are not.

Returning to FIG. 3, after determining in step 311 that a distraction has occurred, the event monitor in step 312 may capture information identifying the distracting event. The capturing may include buffering and/or storing, on a computer readable medium, an indication that the event was a distracting event. The stored information may identify the content that was being originally consumed, the user(s) consuming the content at the time of the distraction, the distracting device, the conditions and/or messages that were deemed to satisfy a distraction condition in the device and/or user profile, the satisfied condition, the time of the distraction (e.g., relative to a start time of the content, or as a time of day), and any associated data from the device regarding the distraction (e.g., a screen capture from a camera, showing the user who has fallen asleep while watching the movie, or showing a visitor who rang the doorbell at the front door). All of this data may be stored in a file in a memory (e.g., hard drive 205 or RAM 203) that corresponds to the user and/or the content. In some embodiments, the information identifying the distracting event need not be stored in a long-term storage or memory, and may instead be temporarily used to carry out some or all of the steps described herein, and then discarded afterwards.

The event monitor then proceeds to respond to the distracting event. In step 313, the event monitor may determine whether the original content being consumed should be recorded into a long-term storage for future access by the users. The determination to record may be based on a variety of factors. First, the determination may depend on whether the content provider has permitted recording. For example, some content, such as pay-per-view events, might be restricted by the provider of the content. These restrictions may be transmitted with the content, and the event monitor may determine whether distraction-based recording is permitted by the content provider. Second, the determination may be based on user preference information. For example, some users may have declined the auto-record option 910. Third, the determination may be based on whether the DVR 113 (or other recording device) has the capacity to record the content. For example, if the memory of the DVR 113 (or the remote storage in a network DVR allocated to the user) is too full to record the content, then the recording will not be done. If none of the conditions above prohibit the recording, then the recording will be conducted in step 314. Note that the recording may be done for different users who are consuming the content. For example, if a networked DVR is used, then a copy of the program may be recorded to each user's storage allocation. If only a single recorder is available, then arbitration may be conducted to determine whether the recording will occur. Arbitration may resolve conflicts between users who wish to proceed differently, and an example is described further below with regard to step 319.

The step 313 determination referenced long-term storage for the recording. Long-term may refer to storage that persists until deleted or viewed by the user, or is stored for a longer duration than what may be found in circular pause buffers that may be used to pause live television. For example, a DVR 113 may include a long-term storage allocation in which a user's selected programming may be maintained until deleted by the user, and a short term buffer storage that buffers the currently-tuned program for supporting pausing of live TV, but which automatically deletes its contents when the user changes channels, or when the buffer fills up due to pausing for a long time.

In step 315, the event monitor may determine whether automatically pausing the content is permitted by the content provider. As discussed above with respect to recording, a content provider may also indicate that their content should not be paused. For example, a broadcaster might not want to allow auto-pausing for the live broadcast of an awards show, or a sporting event broadcast. In another example, a network might not want to allow auto-pausing for a second-screen event, but would allow auto-pausing when a user leaves the room as detected by a camera. The network could prohibit or only allow auto-pausing during certain times, such as during primetime, which might be 7-11 pm. In another example, it might be a network, a producer or director of a particular video program, or a cable or satellite company that determines that auto-pause should not be allowed for a particular video program. Thus a video program service provider could allow or prohibit auto-pausing based on any of a number of factors, examples of which might include the event type, the device that detected the event, the video program, the time of broadcast, or another factor. According to another related aspect, a server or other part of the system might store a plurality of indicators of video programs prohibited by a video program service provider from pausing.

If pausing is permitted, then in step 316, the event monitor may check to determine whether all of the users consuming the content would permit automatically pausing the content in response to one of the users becoming distracted by the particular distraction. For example, a user might want to auto-pause whenever she is distracted by her landline telephone, but not when she is distracted by her tablet. Whether to auto-pause could also be dependent on, in the case of the distracting event being an application, such as a smartphone or tablet app, which application is being used. For example, the system might auto-pause when the distracting event is associated with an e-book reader app, but not auto-pause when the distracting event is associated with a game. In one embodiment, a user can select in the user preferences whether to auto-pause or not for a certain application, as shown in FIG. 10. Column 1010 allows a user to select which applications 1006 should trigger an auto-pause, and which ones should not. Note that in column 1008, where a user can select whether an application 1006 should cause a distracting event at all, there can be applications 1006 that are distracting events, but that do not trigger an auto-pause, such as using a Web browser or Game 2.

As noted above, users may specify parameters and conditions for distractions, and one example parameter may relate to other users. A first user may indicate that they are willing to allow content to be paused if another co-viewer is distracted to, for example, answer the front door or telephone. The indication may be specific to distracting devices or applications. For example, the first user might allow pausing if another user gets up to answer the front door, but the first user might not allow pausing in response to the other user becoming distracted by an application on that other user's smartphone. These preferences may all be indicated in the users' respective profiles discussed above.

If auto-pause is allowed by the content provider, then in step 316, the event monitor may determine whether any users consuming the content would want to pause the program. This determination may be made using the various users' profile information. In some embodiments, the determination may also be made by a poll. For example, the event monitor may signal the gateway 111 and/or DVR 113 to display a message, requesting users to indicate whether the content should be paused in response to the distraction. If any users permit pausing the content, then in step 317 the event monitor may determine whether all users wish to pause the content. This determination may be made using the results of step 316.

If all users wish to pause, then in step 318 the content will be paused, and the unwatched future portions of the content may be buffered in a pause buffer of the DVR 113. If at least one user wishes to pause and one user does not, then in step 319, the event monitor may proceed to arbitrate between the users and determine whether pausing will occur.

Figure 11:
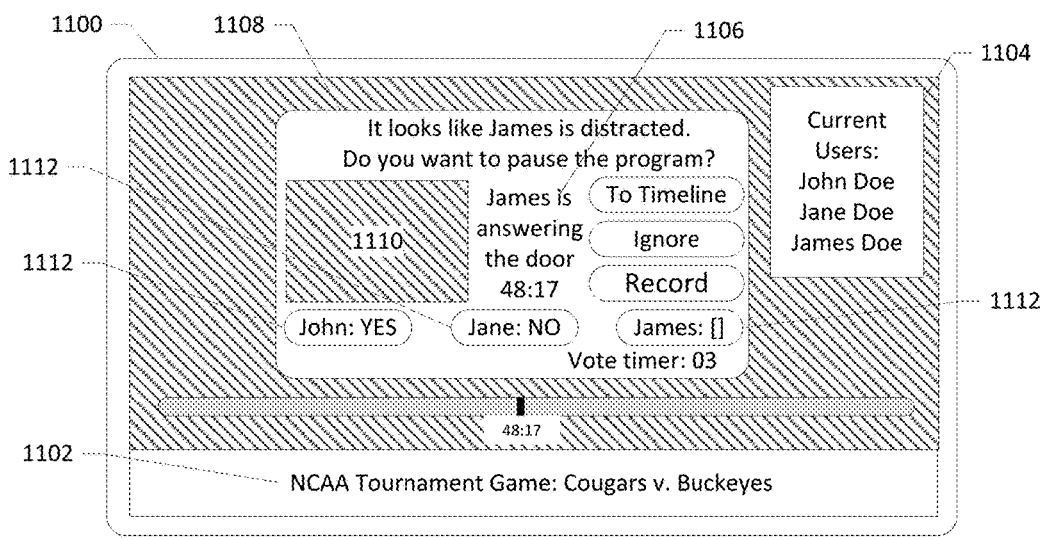
Figure 14:
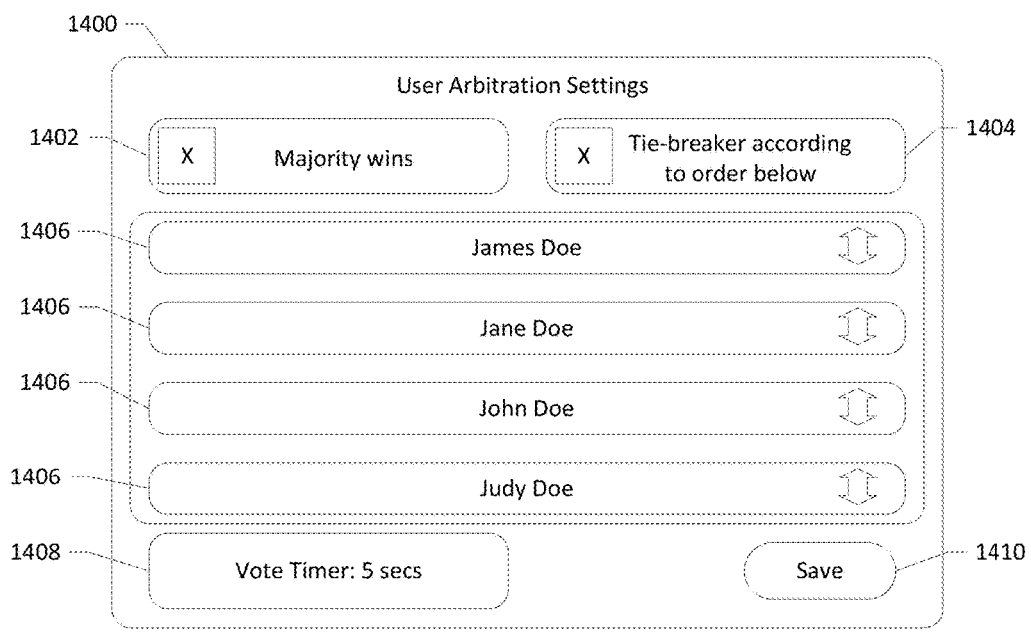

One example of how this arbitration could be done is illustrated in FIG. 11. The currently playing program title 1102 is listed at the bottom of the screen. There are three users 1104 watching the video program: John Doe, Jane Doe, and James Doe. The distraction 1106, which the system detects and displays, is James getting up to answer the door at time 48:17. Not all of John, Jane, and James allow auto-pause in response to this distracting event, so the system displays a pop-up window 1108 overlaid over the game. The game could pause in the background, or in another embodiment continue playing, or in a further embodiment play in a smaller window 1110. Each of John, Jane, and James can vote 1112 whether to auto-pause the program. John, Jane, and James might have a remote control application installed on their personal smartphones or tablet devices, and so they could vote using their own personal remote controls. Or each could have a separate remote control. In another embodiment, they could simply pass the remote control around the room, or raise their hands if a camera is available to detect their physical gestures, and the event monitor device can simply count the votes. The event monitor device may then decide whether to auto-pause using the votes and the pre-defined user arbitration rules. An example of an interface to define user-arbitration rules is illustrated in FIG. 14, and discussed later. In another embodiment, not illustrated, the system does not ask each user to vote, but simply asks whether to auto-pause, and allow the current users to select an option to pause or not to pause. In another embodiment, the system only auto-pauses if it determines in step 317 that all current users want to auto-pause. Conversely, the system might always auto-pause if at least one user wants to auto-pause. If in step 319 the system determines that it should auto-pause, then it can proceed to step 318 and pause the display. If the determination is to not auto-pause, then it can proceed to step 320.

In step 320, the event monitor may determine whether alternate content should be provided in response to the distraction. Alternate content might play in a smaller window on the screen, or might play full-screen, and can be provided concurrently with the distraction or at some predefined later time (e.g., the next time the user logs in to a web portal, the user may be presented with an advertisement offering a video-on-demand purchase of a movie during which the user was distracted). Alternate content could be almost anything, such as advertisements that are related to the content and/or the distraction, a pre-recorded video program, another channel, movie trailers, or additional content related to the current show. The determination of whether to display alternate content can be made using the same types of criteria used to determine whether to auto-pause. User preferences, content provider restrictions, and multi-user arbitration may all be used in a similar manner to determine whether alternate content should be displayed. If the system determines in step 320 that alternate content is allowed, then in step 321, the event monitor may request the delivery of the alternate content, and provide it in the desired manner (e.g., overlay image atop the paused content). If alternate content is not allowed, then the system does not start the playback of the alternate content.

In step 322, the event monitor device may determine whether the distraction has ended. This determination may be made in a variety of ways, depending on how the distraction was detected in the first place. For example, if the distraction was the user surfing the web on a tablet computing device, then the tablet may measure an amount of time passing between user interactions with the web browser (e.g., time between user inputs like scroll commands and text entry), and if it exceeds a predetermined minimum (e.g., 5 minutes), then the tablet may send a message to the event monitor device indicating that the user has ceased to surf the web. The tablet may also send this message if the user closes the browsing application. If the distraction was the user answering the door, the event monitor device may detect when the door is closed again, or when the user has returned to his/her seat and is once again facing the television (as detected by a camera). If the distraction was the user engaging in a voice chat or phone call using telephone 117, the event monitor device may detect the termination of the voice session, or the ensuing on-hook signal from the telephone 117, and determine that the distracting telephone call has ended. If the distraction was a loud conversation detected using microphones, then the event monitor device may determine when the conversation has ended by identifying a predetermined amount of silence in the speaking voices (e.g., 10 seconds).

The process can remain in step 322 until the distraction ends, and once it ends, the process may return to step 325. The process may also arrive at step 325 if, in step 311, no distractions have occurred. In step 325, the event monitor may determine whether the user is still consuming the content. This determination may be made in the same manner as the determination in step 309. If the user is still consuming the content, then the process may return to step 310, and may repeat the steps from there. If the user is no longer consuming the content, then the process may proceed to step 326.

In step 326, the event monitor checks if the user requested to display a timeline. In one embodiment, a remote control used to control the consumption device (e.g., a DVR, display or television remote control) has a timeline button that the user can press at any time to display a timeline for the currently-viewed program. In another embodiment, the timeline view request is accessed from a menu option. In another aspect, a system could be configured to automatically display a timeline at the end of every video program, or alternatively at the end of every video program during which a distracting event occurred.

If a timeline request has been made, then in step 327, the event monitor may check if the timeline display request comes from a menu button, such as the User-Profile Management screen illustrated in FIG. 4. If the user selects to view Saved Timelines 410, then in FIG. 3 the system in step 328 examines the timelines that have been stored in the event monitor's storage, and identifies the ones that are available to the user who made the request. The user's identity may be obtained through a login process before using the remote, or through facial recognition using a camera, or any other desired identification technique.

In step 329, the event monitor may display, on an interface presented to the user via a tablet or computing device, or via an on-screen display from the DVR, a list of all identified timelines. One example interface for displaying a list of video programs with associated timelines is illustrated in FIG. 5, which was described previously. The interface displays a list of video programs that have associated saved timelines, and that are also associated with the user. The user is identified 502 on the interface. The interface includes a date 506 associated with the video program. In one embodiment, the date 506 might be the original broadcast date. In another embodiment, the date 506 might be the date that the video program was actually viewed. The interface displays the number of distracting events associated with that timeline and video program. The listing of timelines, may in other embodiments, not illustrated, include other details or information about the video program or timeline, such as thumbnail images of screenshots from the program, a description of the program, information about the actors or creators of the program, specific details about the types of distracting events, or other information. There might be a way to filter the list of timelines to only display, for example, timelines from a certain period of time, such as the last week, or to only display timelines from a particular channel, such as E!, or to only display video programs starring a particular actor.

In step 330, the event monitor device may receive a user selection of one of the timelines, and may retrieve information that was stored in step 312, when distractions occurred during the consumption of the content. If, in step 327, the user did not select the timeline option from a menu, then in step 331, the monitor device may by default determine that the user has requested to view a timeline for content that the user is currently consuming, such as the currently-viewed video program. The monitor device may identify the currently-consumed content by polling the consumption device, comparing a current time and service number with a predetermined schedule of programs, or through any other desired means.

In either case, the monitor device may retrieve and display the selected content's timeline in step 332. The timeline may include one or more indicators of distracting events that occurred during the display of a video program. Alternatively, the timeline display may include the display of the distractions that occurred, the time when they occurred, and any additional information such as thumbnails from the content or data from the distracting event (e.g., a snapshot of the door camera image).

Figure 12A:
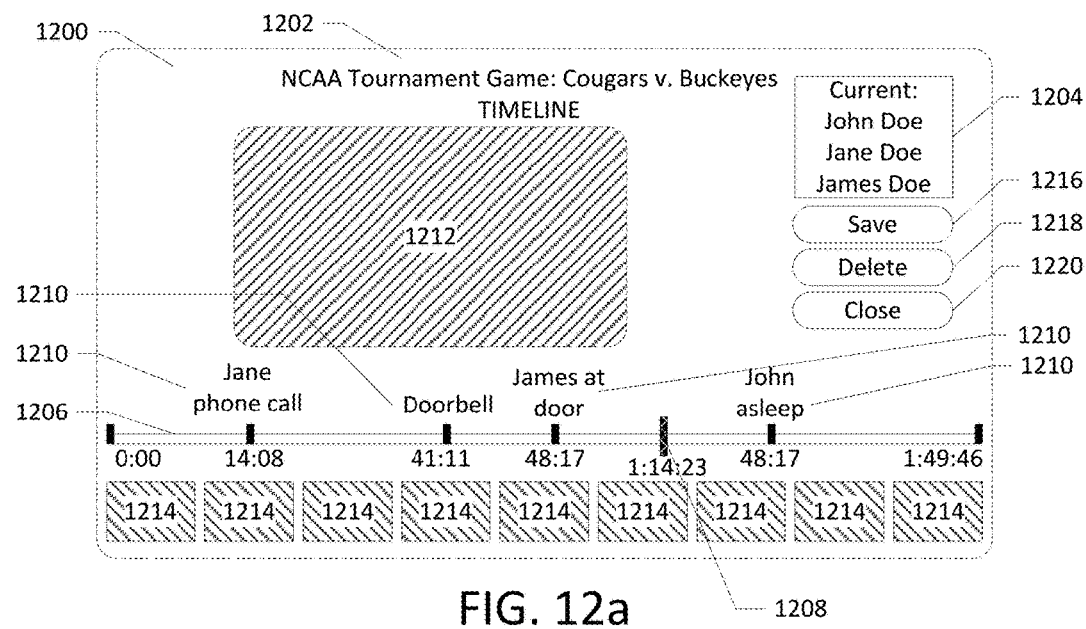
Figure 12B:
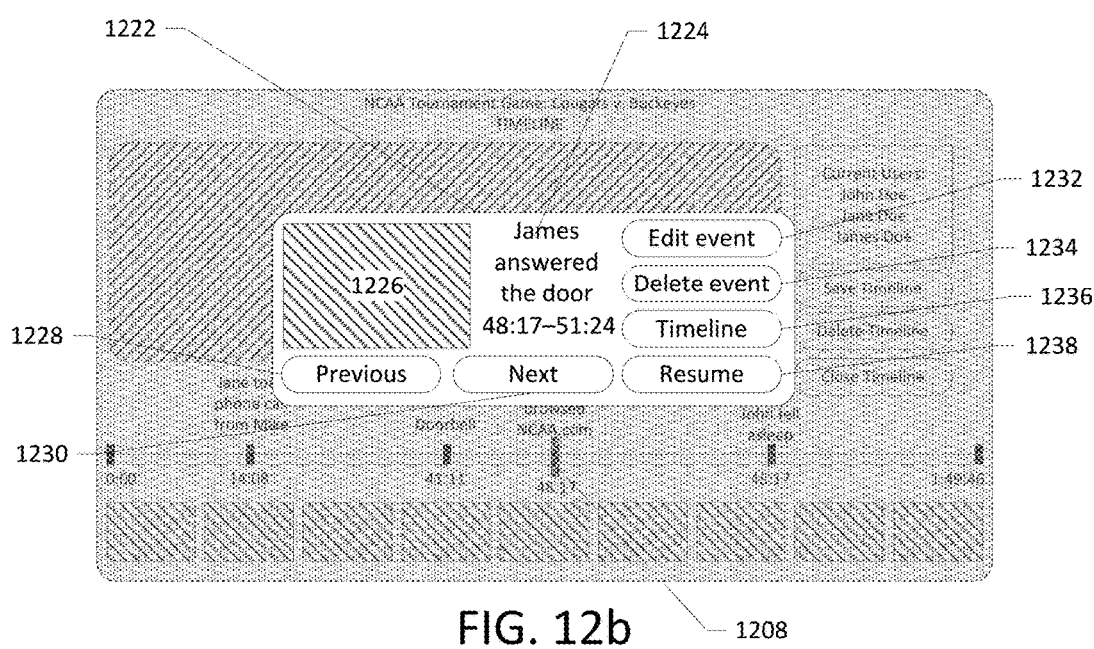

An example of a timeline display is illustrated in FIGS. 12a-b. In FIG. 12a, the main timeline view 1200 is shown. The title 1202 of the program is shown at the top of the screen. The list 1204 of currently active user profiles is shown. The timeline 1206 itself is towards the lower part of the screen. The current time indicator 1208 is shown at the appropriate place on the timeline. This can move forward or backward, or fast-forward or rewind to quickly select a point in the video program for playback. The timeline includes a plurality of indicators 1210 corresponding to a plurality of distracting events. Each indicator 1210 is displayed on the timeline in chronological order corresponding to the time in the video program when the corresponding distracting event occurred. For example, at time 14:08 Jane took a phone call from Mike. At time 41:11 the doorbell rang. At time 48:17 James answered the door. At time 48:17 John fell asleep (as determined via a camera observing his eyes closed and/or body position). The current time indicator 1208 can be quickly moved forward or backward from one distracting event to the next, for example by a forward or back button on a remote.

The timeline may also include a number of indicators of events that occurred within the video program, such as screenshots of scenes. For example, video or screenshots from the timeline, such as from the current time indicator 1208 or from the selected distracting event 1210, are shown on part of the screen 1212. Smaller thumbnail screenshots 1214, such as those generated in step 348, are shown evenly spaced along the bottom of the screen. In another embodiment, the thumbnails are spaced so as to be close to the time on the timeline that they are associated with. The thumbnails may be images from the underlying content, and/or from the source of the distraction, and may be positioned along the timeline at an approximate time when the content scene or distraction occurred during the presentation of the content.

In step 333, the monitor device may determine if the user selects a particular time or distracting event in the timeline, such as by navigating the current time indicator 1208 to the particular distracting event and then pressing a "select" or "enter" key on the remote control. If the user selected a distraction, then in step 334, and in one embodiment illustrated in FIG. 12b, a pop-up display window appears over the front of the timeline display, showing additional details of the selected distraction. The pop-up display window 1222 includes a description 1224 of the selected distracting event. There is a thumbnail image 1226, which could be a screenshot of the video program at the time of the distraction. Or in another embodiment the image 1226 could be a screen capture from the second-screen device on which the distracting event occurred, or an image from an attached camera box at the time of the distracting event. The pop-up display window 1222 includes navigation buttons to quickly navigate to the previous distracting event 1228 or the next distracting event 1230.

The user has many options of ways to interact with the timeline. In step 335, the user may request to resume playback from a point on the timeline. This may be useful, for example, if the user has completed viewing a program, but realizes she has missed a plot point due to an earlier distraction. The user may view the timeline, identify the distracting event that caused the user to lose attention, and resume playback from that point. In the embodiment depicted in FIGS. 12a-b, the user selects one of the indicators on the timeline, and then the event monitor may instruct the consumption device (e.g., a DVR) in step 336 to automatically resume playback from the time associated with the indicator corresponding to the time during the display of the video program that the distracting event occurred. Another way to request to resume playback is to select the resume play button 1238 from the pop-up display window 1222 in FIG. 12b. Another way to resume playback would be to press the "play" button from screen 1200 in FIG. 12a when the current time indicator 1208 is at the desired time.

Another option may be to share a video clip with a friend. In step 337, the user may request to share a clip from the timeline. A user may wish to share a particularly funny, moving, or otherwise significant portion of a video program with a friend. In one example, the user may wish to share the clip on her own social media profile, or alternatively on that of a friend. After selecting the desired portion of the video program from the timeline, the user sends a "share clip" command. The event monitor in step 338 may prompt the user for the desired sharing method, which could include email, sending the clip directly to the other user's television, transmitting the clip through an electronic device app, such as the COMCAST XFINITY app, or by posting the clip to a social media profile, such as one of the profiles associated with the user profile, as described earlier in connection with FIG. 8.

In step 340, the user may request to edit the timeline. The user might wish to delete a certain distracting event, rename the timeline, disassociate the timeline from her own user profile, or otherwise change a part of the timeline, or delete the timeline altogether. In the embodiment depicted in FIG. 12, the pop-up display window 1222 includes an edit event button 1232. The edit event button 1232 allows the user to edit a distracting event. For example, the user might associate or disassociate one or more users with or from the distracting event. Additionally, the user might want to change the duration of the distracting event, or revise the description. Also, a user may wish to delete a distracting event. The pop-up display window 1222 includes a delete event button 1234 that allows a user to delete the selected event from the timeline. There could be other ways that the user wants to edit an event or another part of the timeline. In FIG. 3, after the system receives the user edit request, it processes the edit request in step 341. Processing the request includes making the requested change to the distracting event or timeline, and saving the change to the system. Afterwards, the event monitor may determine, in step 342, whether the user has requested to close the timeline. If so, the process may return to step 301. If not, the process may return to step 333.

The various features described above may be carried out by an event monitor device, whose processor may execute software application instructions stored in a memory (e.g., RAM, external memory, etc.) to provide, perform, and/or control the features. These various applications may be made available for purchase and/or download via a computing device, such as app server 107, which may download additional applications upon user request. The additional applications may provide any number of additional sub-panels and interactive features. In some embodiments, the software may reside partially (or totally) at the app server 107, such that the event monitor device may need only be a remote client terminal or "dumb box" that conveys user inputs and renders displays supplied to it from an external source, such as the app server 107.

In some embodiments, the system includes a way for a user to actively indicate that a distraction has ended. For example, the remote control may include a "distraction ended" button. If the system receives input from the user that the distracting event has ended, it could rewind the video program to the time the distracting event occurred, and resume display of the video program at the time.

Figure 13:
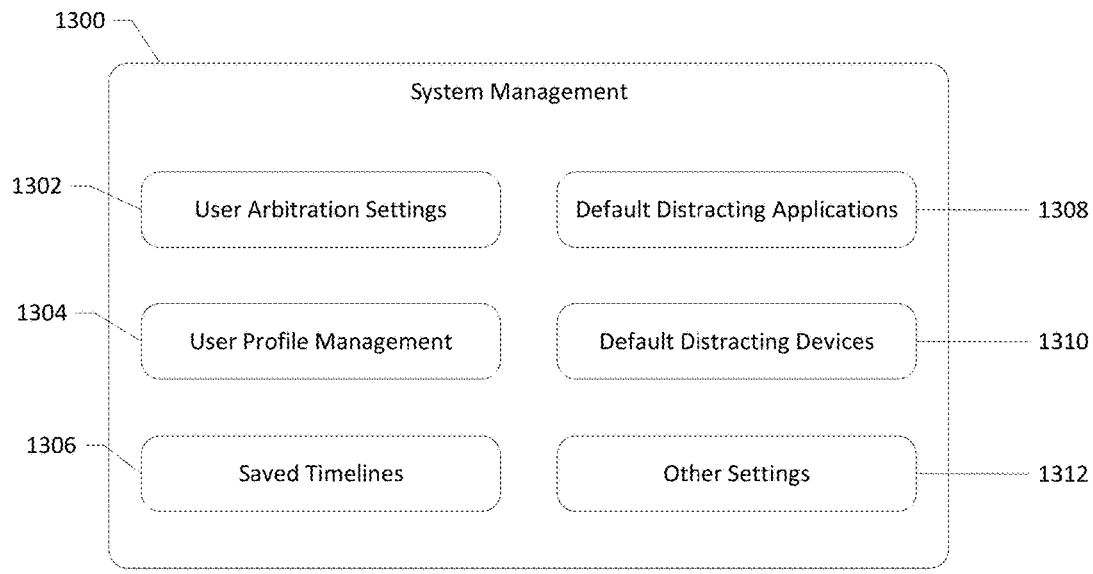

In some embodiments, the system menu includes a System Management interface 1300 as depicted in FIG. 13. The system management interface 1300 allows a user to manage various aspects of the system. Each button could link to a different menu screen. The interface 1300 includes a user arbitration settings button 1302 that links to the User Arbitration Settings interface 1400 depicted in FIG. 14. The user-profile management button 1304 links to the User-Profile Management interface 400 depicted in FIG. 4. The saved timelines button 1306 links to the Saved Timelines interface 500 depicted in FIG. 5. The default distracting applications button 1308 could link to a distracting applications interface 1000 like the one depicted in FIG. 10, but instead of being associated with a particular user profile, it sets generic or system-wide distracting application preferences. The default distracting devices button 1310 could link to a distracting devices interface 700 like the one depicted in FIG. 7, but instead of being associated with a particular user profile, it sets generic or system-wide distracting device preferences. There could be a button 1312 to access other system settings.

In some embodiments, the system includes a User Arbitration Settings interface 1400 for setting rules for user arbitration, as described earlier. In the depicted embodiment, the interface 1400 includes a selector 1402 for indicating whether to use a "majority wins" approach or not. If the majority wins selector 1402 is selected, then if a conflict arises in processing user preferences in responding to a distracting event, then the system will allow the currently viewing users to vote. For example, if one user wants to auto pause, but two other users do not want to auto pause, then the system will allow the votes of the users to decide, and will not auto pause because it is two against one in favor of not auto pausing. The interface 1400 includes the option 1404 to determine ties in the voting by ordering the user names 1406. For example, if James Doe and Jane Doe are viewing a program, and the system needs to determine whether to auto-record the program or not, it could allow James and Jane to vote. If James votes to record, but Jane votes not to record, then the system will record, because James is set 1406 to win tie-breakers over Jane. The system might have a time limit for voting, which can be set using the vote timer setting 1408. The vote timer setting 1408 determines how long users have to vote. For example, if there are three currently viewing users, but only one has voted by the time the timer runs out, then the preference of the one that voted will prevail, regardless of the user arbitration order established in the User Arbitration Settings interface 1400. The interface 1400 also includes a save button 1410 to save user arbitration settings to the system.

In some embodiments, each timeline is associated with an instance of a user viewing a video program. In another embodiment, the timeline is associated with the video program, and the same timeline is updated with additional distractions when a user watches the same video program a second time. In an alternative embodiment, the same timeline could update to remove distractions the second time. That is, if a user was distracted the first time while watching a video program, a distraction would exist on the timeline. But if the user is not distracted during that portion of the show the second time, that distraction would be removed from the timeline.

In some embodiments, the system includes integration with a social network to post information about the user's distraction history. For example, if a user watches an entire video program without any distracting events, then the system might award a "distraction-free viewing" badge for that particular show on a social network that tracks television and movie viewing, such as TUNERFISH.

In some embodiments, a timeline might be for an entire viewing session instead of a single video program. The timeline could include time indicators that indicate where each program starts and stops. The timeline could also include programs from different channels. For example, the timeline might include indications of when a channel was changed, and what program was viewed after the channel change. Distracting events then are not tied to a specific video program, but rather to the time period during which the user interacted with the system, regardless of what video program is being viewed.

In some embodiments, at the end of a video program, the system automatically displays a timeline from the viewing of that video program. In another embodiment, the system automatically displays a timeline at the end of a viewing session in which multiple programs were watched. Alternatively, when a user first turns on the system, it could automatically display a timeline from the user's previous viewing session. The user could then pick up where she left off in a particular video program, go back and rewatch a particular video program, or just watch something else.

In some embodiments, the timeline includes video or other content from devices other than the television. For example, if a distracting event was a second-screen event where the user was viewing an online video, then the timeline might include the online video from the second-screen device, inserted at the appropriate time within the timeline. The user might be able to view the online video on the television from the timeline, or otherwise interact with it, such as by sharing it or removing it from the timeline.

In some embodiments, the adaptively learns user preferences. For example, if a user always ignores or deletes those distracting events generated by a tablet, then the system could update the user preferences to no longer consider event occurrences on the tablet to be distracting events. Similarly, if the user always ignores or deletes distracting events generated by the web browser on her smartphone, then the system could update the user's preferences to no longer consider web-browser related event occurrences to be distracting events.

In some embodiments, the system might use distraction data from a user's timeline history to predict or set system recording schedules. For example, if a user never gets distracted while watching the evening news, then the system might learn that the evening news is very important to the user, and then always record the evening news in case the user is out of the house during the evening news one day.

In many of the embodiments described above, a determination is described as being made in response to a user setting or preference. One of skill in the art will recognize that any such setting or preference might be built into the system, or pre-determined by the manufacturer, seller, distributor, or another party other than the end user. Similarly, according to another aspect, any such setting might be available as a generic setting for the system or device as a whole, instead of customizable for individual users.

In some embodiments, a user may be able to mark a particular portion of a piece of content with a simulated distraction signal. For example, the user could press a button on a remote or a tablet, to send a command to the event monitor that the current scene in the content should be tagged and shown in the timeline along with the distractions. In this way, if the user wishes to mark a favorite or interesting portion of the content, the user can quickly do so by sending the command. The event monitor may treat the command as if it were a distraction, recording the information noted above. So in one example, the user could tag a great play from a football game, and have it appear in the timeline afterwards. The user could then send the timeline and/or tagged portion (or an identifier thereof) to a friend, who might be able to use the same timeline to watch the tagged play.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

What is claimed is:

1. A method comprising:
    determining, by a first computing device, a first distracting event comprising a user engagement with a second computing device during presentation of content to a user via the first computing device;
    determining, by the first computing device, that the first distracting event distracted the user from the presentation of the content;
    generating, by the first computing device, a timeline that comprises a plurality of indicators corresponding to a plurality of distracting events, wherein the timeline comprises:
        an image associated with the first distracting event;
        an indication that the first distracting event distracted the user from the presentation of the content; and
        an indicator of a point in time when the first distracting event occurred; and
    causing display of the timeline.

2. The method of claim 1, comprising:
    determining a second distracting event occurring on a third computing device during the presentation.

3. The method of claim 1, wherein determining the first distracting event is performed automatically by the first computing device without user input.

4. The method of claim 1, wherein the image comprises a screenshot from the second computing device.

5. The method of claim 1, wherein the image comprises an image retrieved from a database.

6. The method of claim 1, wherein the image comprises a graphic corresponding to a type of the first distracting event.

7. The method of claim 1, comprising:
    generating a list of available timelines each corresponding to prior presentation of content to the user;
    receiving a selection of the timeline from the list of available timelines; and
    causing display of the timeline based on receiving the selection of the timeline.

8. The method of claim 1, comprising:
    setting a system recording schedule based on the indicator of the point in time when the first distracting event occurred.

9. The method of claim 1, wherein the timeline is generated automatically based on a display associated with the first computing device being activated.

10. The method of claim 1, comprising:
    updating the timeline to include an indicator of a second point in time when a second distracting event occurred during a second presentation of the content to the user.

11. The method of claim 1, comprising:
    determining a type of the first distracting event; and
    continuing the presentation of the content based on the determination that the first distracting event is of a first type.

12. The method of claim 1, comprising:
    creating a user-preference profile indicating a first type of content that is to be autopaused based on the user being distracted during presentation of content of the first type, and identifying a second type of content that is not to be autopaused based on the user being distracted during presentation of the content of the second type.

13. The method of claim 1, comprising:
    selecting targeted advertising for display to the user based on the first distracting event.

14. The method of claim 1, comprising:
    determining that the presentation of the content is to a plurality of users;
    determining that at least one of the plurality of users is not distracted when the user is distracted; and
    conducting arbitration among remaining users of the plurality, to determine whether to pause the presentation of the content based on the user being distracted.

15. The method of claim 14, wherein the arbitration is conducted based on a plurality of distraction preference settings associated with the remaining users.

16. The method of claim 1, comprising:
    receiving a selection of the indicator of the point in time when the first distracting event occurred; and
    generating a display comprising additional information related to the first distracting event.

17. The method of claim 1, further comprising:
    adjusting the presentation of content based on the determining that the first distracting event distracted the user, wherein the presentation of content is adjusted according to a stored profile associated with the user.

18. The method of claim 17, wherein adjusting the presentation of content comprises one or more of pausing the presentation of content or displaying alternative content.

19. The method of claim 1, further comprising:
updating stored timeline preferences based on receiving a user input indicating a change to stored timeline preferences.

20. A method comprising:
determining, by a first computing device, a first distracting event occurring during presentation of content to a user via the first computing device, a source of the first distracting event being a computer-executable application presented on a same display as the presentation of the content to the user, the computer-executable application being different from the content;
determining, by the first computing device, that the first distracting event distracted the user from the presentation of the content;
generating, by the first computing device, a timeline that comprises a plurality of indicators corresponding to a plurality of distracting events, wherein the timeline comprises:
an image associated with the first distracting event;
an indication that the first distracting event distracted the user from the presentation of the content; and
an indicator of a point in time when the first distracting event occurred; and
causing display of the timeline.

21. A method comprising:
identifying, by a computing device, a plurality of distracting events occurring during presentation of content to a user;
determining, by the computing device, whether each distracting event of the plurality of distracting events distracts the user from the content;
based on determining that at least one of the plurality of distracting events distracts the user from the content, storing, by the computing device, information indicating a type of the at least one of the plurality of distracting events and a point in time when the at least one of the plurality of distracting events occurred;
causing, by the computing device, display of a timeline corresponding to the presentation of the content to the user, wherein the timeline comprises:
at least one indication identifying the at least one of the plurality of distracting events;
at least one indication of the point in time when the at least one of the plurality of distracting events occurred; and
at least one image associated with the at least one of the plurality of distracting events; and
storing, by the computing device, the timeline in a memory.

22. An apparatus comprising:
one or more processors; and
memory storing instructions that, when executed by the one or more processors, cause the apparatus to:
determine a first distracting event comprising a user engagement with a computing device during presentation of content to a user via the apparatus;
determine whether the first distracting event distracted the user from the presentation of the content;
generate a timeline that comprises a plurality of indicators corresponding to a plurality of distracting events comprising the first distracting event, wherein the timeline comprises:
an image associated with the first distracting event;
an indicator of the first distracting event; and
an indicator of a point in time when the first distracting event occurred; and
cause display of the timeline.

23. The apparatus of claim 22, wherein the instructions, when executed by the one or more processors, further cause the apparatus to:
generate a list of available timelines each corresponding to prior presentation of content to the user;
receive a selection of the timeline from the list of available timelines; and
cause display of the timeline based on receiving the selection of the timeline.

24. The apparatus of claim 22, wherein the instructions, when executed by the one or more processors, further cause the apparatus to set a system recording schedule based on the indicator of the point in time when the first distracting event occurred.

25. The apparatus of claim 22, wherein the instructions, when executed by the one or more processors, further cause the apparatus to automatically generate the timeline based on activation of a display associated with the computing device.

26. The apparatus of claim 22, wherein the instructions, when executed by the one or more processors, further cause the apparatus to update the timeline to include an indicator of a second point in time when a second distracting event occurred during a second presentation of the content to the user.

27. A system comprising:
a first computing device, wherein the first computing device comprises:
one or more processors; and
memory storing instructions that, when executed by the one or more processors of the first computing device, cause the first computing device to cause presentation of a first content to a user; and
a second computing device, wherein the second computing device comprises:
one or more processors; and
memory storing instructions that, when executed by the one or more processors, cause the second computing device to:
determine a first distracting event comprising a user engagement with the first computing device during presentation of a second content to the user via the second computing device;
determine whether the first distracting event distracted the user from the presentation of the second content;
generate a timeline that comprises a plurality of indicators corresponding to a plurality of distracting events comprising the first distracting event, wherein the timeline comprises:
an image associated with the first distracting event;
an indication that the first distracting event distracted the user from the presentation of the second content; and
an indicator of a point in time when the first distracting event occurred; and
cause display of the timeline.

28. The system of claim 27, wherein the instructions stored in the memory of the second computing device, when executed by the one or more processors of the second computing device, further cause the second computing device to:
generate a list of available timelines each corresponding to prior presentation of content to the user;
receive a selection of the timeline from the list of available timelines; and
cause display of the timeline based on receiving the selection of the timeline.

29. The system of claim 27, wherein the instructions stored in the memory of the second computing device, when executed by the one or more processors of the second computing device, further cause the second computing device to set a system recording schedule based on the timeline identifying the point in time when the first distracting event occurred.

30. The system of claim 27, wherein the stored in the memory of the second computing device, when executed by the one or more processors of the second computing device, further cause the second computing device to automatically generate the timeline based on activation of a display associated with the first computing device.

31. The system of claim 27, wherein the instructions, when executed by the one or more processors, further cause the second computing device to update the timeline to include an indicator of a second point in time when a second distracting event occurred during the presentation of the second content to the user.

* * * * *